(12) United States Patent
Farole et al.

(10) Patent No.: US 9,825,450 B2
(45) Date of Patent: Nov. 21, 2017

(54) CONDUCTOR ARRANGEMENT WITH CONDUCTOR AND CONTACT ELEMENT

(71) Applicants: Tyco Electronics AMP GmbH, Bensheim (DE); Tyco Electronics Corporation, Berwyn, PA (US)

(72) Inventors: Dominic Anthony Farole, Hummelstown, PA (US); Antonio Lehner, Nauheim (DE)

(73) Assignees: TE Connectivity Germany GmbH, Bensheim (DE); TE Connectivity Corporation, Berwyn, PA (US)

( * ) Notice: Subject to any disclaimer, the term of this patent is extended or adjusted under 35 U.S.C. 154(b) by 122 days.

(21) Appl. No.: 14/386,301

(22) PCT Filed: Mar. 21, 2013

(86) PCT No.: PCT/US2013/033263
§ 371 (c)(1),
(2) Date: Sep. 18, 2014

(87) PCT Pub. No.: WO2013/142666
PCT Pub. Date: Sep. 26, 2013

(65) Prior Publication Data
US 2015/0047899 A1    Feb. 19, 2015

Related U.S. Application Data

(63) Continuation of application No. PCT/US2013/027604, filed on Feb. 25, 2013.

(30) Foreign Application Priority Data

Mar. 22, 2012    (DE) .................... 10 2012 204 578

(51) Int. Cl.
*H02G 15/013*    (2006.01)
*H01R 43/05*    (2006.01)
(Continued)

(52) U.S. Cl.
CPC .......... *H02G 15/013* (2013.01); *H01R 4/185* (2013.01); *H01R 43/05* (2013.01); *H01R 4/62* (2013.01); *Y10T 29/49218* (2015.01)

(58) Field of Classification Search
CPC ........ H02G 15/013; H02G 15/04; H01R 4/18; H01R 4/62; H01R 4/185; H01R 43/05; H01R 4/70; H01R 43/28; Y10T 29/49218
(Continued)

(56) References Cited

U.S. PATENT DOCUMENTS 9,070,988 B2 *   6/2015   Sato ................... H01R 4/184
2011/0070770 A1   3/2011   Sakai
2011/0165800 A1 *   7/2011   Kakuta ................ H01R 4/62
                                                        439/880

FOREIGN PATENT DOCUMENTS

DE    102009010568 A1    9/2009
EP        0692843 A2    1/1996
(Continued)

OTHER PUBLICATIONS

International Search Report issued by the European Patent Office, dated Apr. 22, 2013, for the related International Application No. PCT/US2013/033263; 3 pages.
(Continued)

*Primary Examiner* — Michael F McAllister
(74) *Attorney, Agent, or Firm* — Faegre Baker Daniels LLP

(57) ABSTRACT

A method for attaching a contact element comprises steps for providing an electrical conductor with a conductive core and an insulating sheath, for detaching a sheath section of the sheath in an end region of the conductor for displacing the sheath section against the core in such a way that the sheath section protrudes beyond a longitudinal end of the core, and for crimping a contact element to the end region
(Continued)

of the conductor in such a way that at least a part of the sheath section is being enclosed between the contact element and the core.

16 Claims, 4 Drawing Sheets

(51) Int. Cl.
    *H01R 4/62*     (2006.01)
    *H01R 4/18*     (2006.01)

(58) Field of Classification Search
    USPC .......................................................... 174/75 R
    See application file for complete search history.

(56) References Cited

FOREIGN PATENT DOCUMENTS

| | | | |
|---|---|---|---|
| JP | 2003-338329 | * | 11/2003 |
| JP | 2005-339850 | * | 12/2005 |
| JP | 2008-235130 | * | 10/2008 |

OTHER PUBLICATIONS

Written Opinion of the International Searching Authority issued by the European Patent Office, dated Apr. 22, 2013, for related International Application No. PCT/US2013/033263; 7 pages.

* cited by examiner

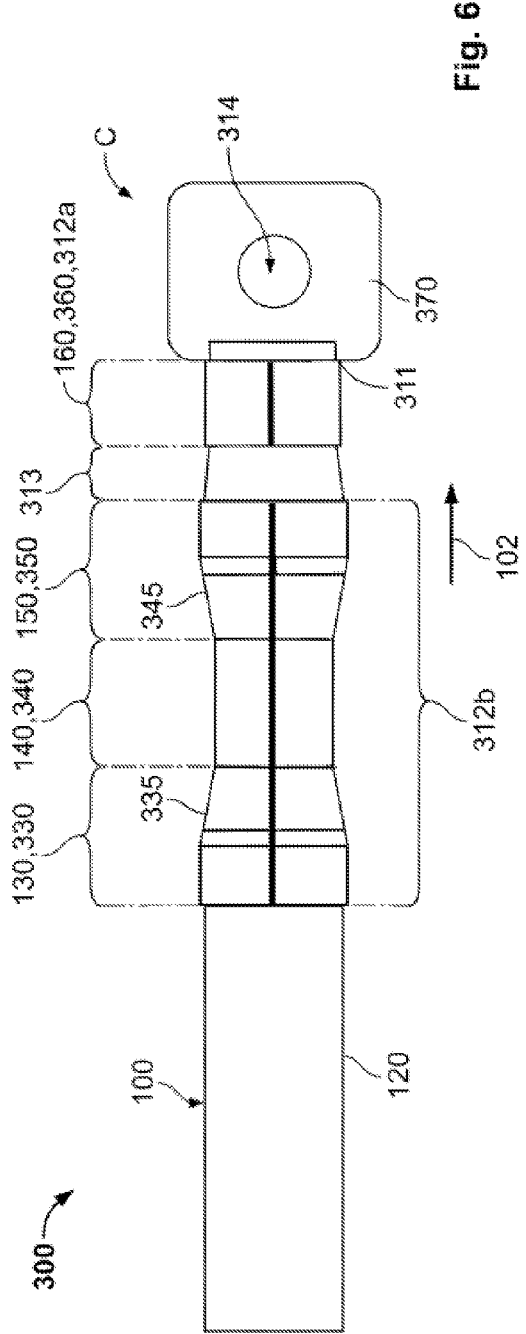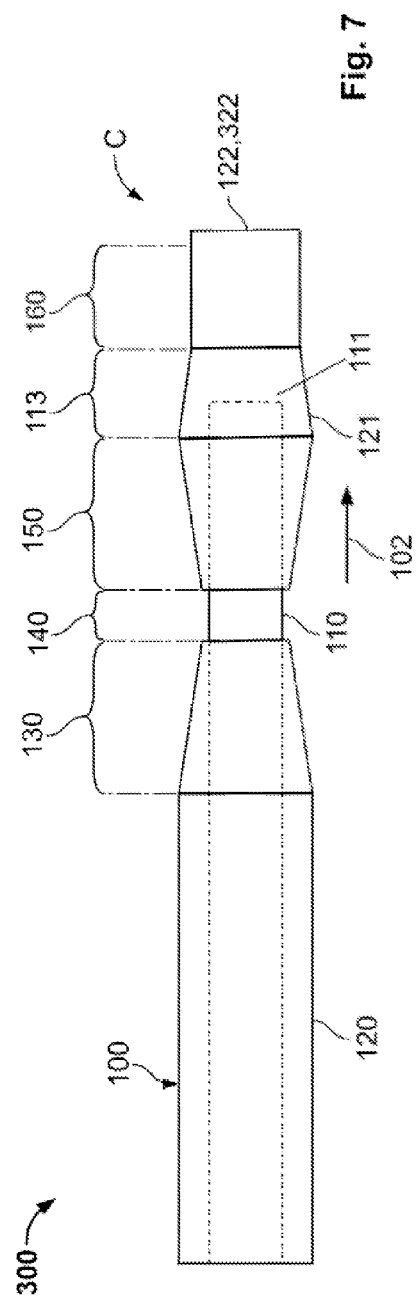

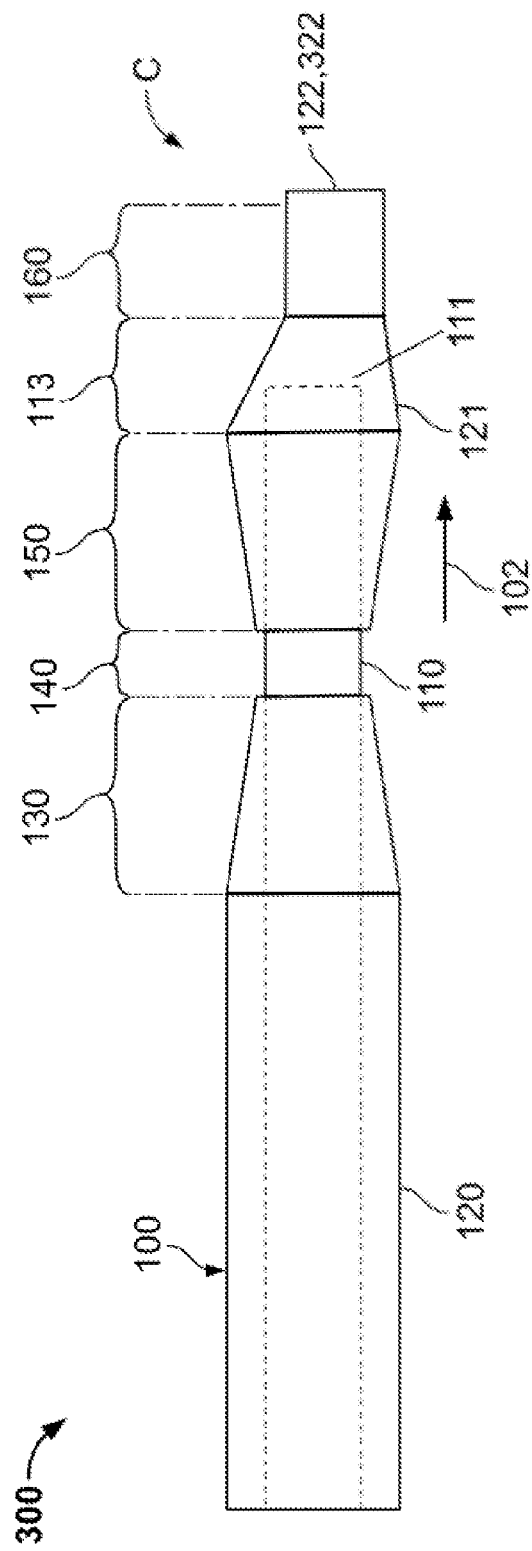

CONDUCTOR ARRANGEMENT WITH CONDUCTOR AND CONTACT ELEMENT

BACKGROUND

The present invention relates to a method for attaching a contact element according to patent claim 1, as well as to a conductor arrangement with a conductor and a contact element according to patent claim 5.

It is known to connect contact elements to electrical conductors through crimping. Conductor arrangements with electrical conductors and pressed-on contact elements are known for example from the DE 10 2009 010 568 A1 and the WO 2009/044166 A1.

It is known that, in a contact region between an electrical conductor and a contact element pressed thereto, intruding moisture may lead to a corrosion which may have a degradation of the electrical specifications of the conductor arrangement of conductor and contact element as a result. Especially it is also known that moisture which intrudes into a contact region between an electrical conductor and a pressed-on contact element that consist of different materials may lead to a corrosion through galvanic effects.

It is hence desirable to protect a contact region between an electrical conductor and a pressed-on contact element against the intrusion of moisture. It is known from the state of the art to protect a contact region between an electrical conductor and a pressed-on contact element through a special design of sections of the contact element against the intrusion of moisture. However, the known solutions are detrimental in terms of the required frame size of the contact element.

SUMMARY

The object of the present invention is to provide an enhanced method for attaching a contact element to an electrical conductor. This object is solved by a method with the features of claim 1. A further object of the present invention is to provide an enhanced conductor arrangement with an electrical conductor and a contact element. This object is solved by the conductor arrangement with the features of claim 5. Preferred further embodiments are specified in the dependent claims.

A method according to the present invention for attaching a contact element comprises steps for providing an electrical conductor with a conductive core and an insulating sheath, for detaching a sheath section of the sheath in an end region of the conductor, for displacing the sheath section against the core in such a way that the sheath section protrudes beyond a longitudinal end of the core, and for crimping a contact element to the end region of the conductor in such a way that at least a part of the sheath section is enclosed between the contact element and the core. Then, the sheath section advantageously seals up a region between the contact element and the core of the conductor. Hereby, the danger of corrosion in the region between the contact element and the core of the conductor is advantageously reduced.

In a preferred embodiment of the method, the detachment of the sheath section is effected by cutting. The cutting off of the sheath section advantageously enables a simple, fast and repeatable detaching of the sheath section of the sheath.

In a preferred embodiment of the method, the protruding part of the sheath section encloses itself entirely around the longitudinal end of the core during the crimping. The protruding part of the sheath section then advantageously seals up a front-side region of the connection between the contact element and the electrical conductor against intruding moisture.

In a useful embodiment of the method, the contact element has a sleeve-like section before the crimping. Thereby, the end region of the conductor is inserted into the sleeve-like section before the crimping. Then, the method is advantageously arranged to be especially simple and repeatable and may be easily automated.

According to a further possible embodiment of the method, the core may be exposed by the displacement of the sheath section and a crimp region of the contact element may be crimped such that in a conductor-side sealing region, the crimp region encloses the sheath and in a contact region of the electrical conductor, the crimp region is in direct contact with the core. Thereby, at the same time, the core may be sealed up in the conductor-side sealing region and may be electrically contacted by the crimp region when pressing on the contact element.

The conductor arrangement according to the present invention comprises an electrical conductor with a conductive core and an isolating sheath and a contact element. Thereby, the core has a longitudinal end in an end region of the conductor. The contact element is pressed onto the conductor in the end region of the conductor. Besides that, between the contact element and the core, a section of the sheath is arranged which is detached from the remaining regions of the sheath. In this conductor arrangement, the detached section of the sheath advantageously seals up a region between the contact element and the core of the conductor against intruding moisture.

In a further embodiment of the conductor arrangement, the detached section of the sheath protrudes beyond the longitudinal end of the core. The detached section of the sheath may then advantageously be simply displaced relative to the core during the manufacturing of the conductor arrangement.

In an especially preferred embodiment of the conductor arrangement, the protruding part of the sheath section is completely enclosed around the longitudinal end of the core. The protruding part of the sheath section advantageously seals up a region between the contact element and the core, then in a front-side direction against intruding moisture.

In a further embodiment of the conductor arrangement, this has a contact region in which an electrical contact exists between the contact element and the core. Thereby, the conductor arrangement furthermore has a contact-side sealing region which is arranged between the contact region and the longitudinal end of the core. Thereby, the detached section of the core is arranged in the contact-side sealing region. The detached section of the sheath advantageously seals up a region between the contact element and the core, then also in the contact-side sealing region.

In an additional embodiment of the conductor arrangement, this has a conductor-side sealing region, wherein the contact region between the contact-side sealing region and the conductor-side sealing region is arranged. Thereby, a further section of the sheath is arranged in the conductor-side sealing region between the contact element and the core. The sheath section arranged in the conductor-side sealing region advantageously seals up a region between the contact element and the core of the conductor, then also on the conductor-side side against intruding moisture.

According to a further possible embodiment of the conductor arrangement, the contact element may comprise a second crimp region, e.g. a ferrule, providing a contact region at least partly forming the contact region of the conductor arrangement. In a further possible embodiment of the conductor arrangement, the contact element may comprise a second crimp region, e.g. an end cap crimped to the conductor in the end region of the conductor, wherein the first and the second crimp regions may be separate pieces and/or crimp regions. Thereby, first and the second crimp regions may be crimped individually, i.e. separately from each other, and may each be designed as required for a certain application. The first and/or second crimp regions may be designed as a customised contact, i.e. precisely adapted to different wire gauges. The first crimp region may be designed as merely serving for sealing up the end region of the conductor and may provide means for mounting the conductor arrangement, i.e. an eyelet, latching elements and mounting members or the like.

In an embodiment of the conductor arrangement, the core includes aluminium.

In an embodiment of the conductor arrangement, the sheath includes PVC (polyvinyl chloride).

In an embodiment of the conductor arrangement, the contact element includes a copper material.

BRIEF DESCRIPTION OF THE DRAWINGS

The invention is described in detail in the following by reference to the figures. Therein:

FIG. 6 shows a slightly schematized top view of a further possible embodiment of a conductor arrangement with an electrical conductor and a contact element, which comprises a first and a second crimp region;

FIG. 7 shows a slightly schematized semi-transparent top view of the electrical conductor in a crimped state within the conductor arrangement illustrated in FIG. 6; and FIG. 8 shows a slightly schematized semi-transparent side view of the electrical conductor in a crimped state within the conductor arrangement illustrated in FIG. 6.

DETAILED DESCRIPTION

Figure 1:
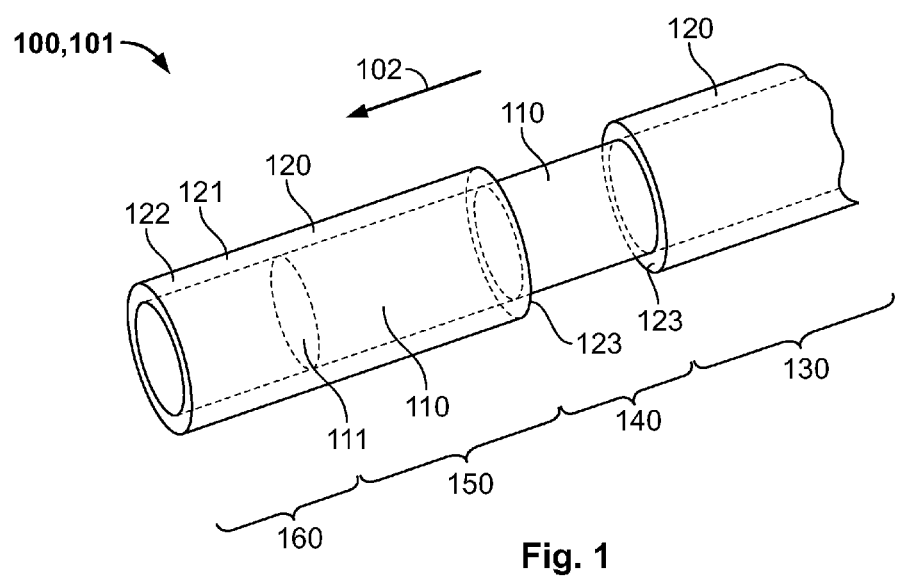
FIG. 1 shows a perspective and slightly schematized illustration of an electrical conductor.

FIG. 1 shows an end region 101 of an electrical conductor 100 in a schematized and semi-transparent view. The electrical conductor may serve for transferring electrical power or for transferring electrical data signals for example.

The electrical conductor 100 has a conductor core 110, which forms a core of the electrical conductor 100. The core 110 is coated by an electrically insulating sheath 120. The core 110 preferably consists of a metal, for example of aluminium. The sheath 120 consists of an isolating insulating material, for example a plastic. The sheath 120 may especially consist of polyvinyl chloride (PVC).

In the end region 101 of the electrical conductor 100, a sheath section 121 of the sheath 120 is cut off from the remaining sections of the sheath along a cutting edge 123. The cut-off sheath section 121 is slid in a longitudinal direction 102 of the electrical conductor 100 over and beyond a longitudinal end 111 of the core 110, so that a part of a sheath section 121 is still arranged around the core 110, while another part of the sheath section 121 forms a projection 122 protruding beyond the longitudinal end 111 of the core 110.

Hence, the electrical conductor 100 in the longitudinal direction 102 subsequently has a conductor-side sealing region 130, a contact region 140, a contact-side sealing region 150 and a front-side sealing region 160. In the conductor-side sealing region 130, the core 110 of the electrical conductor 100 is surrounded by the sheath 120 of the electrical conductor 100. In the contact region 140, the core 110 is exposed by the displacement of the sheath section 121. In the contact-side sealing region 150, the core 110 is surrounded by the displaced sheath section 121. The front-side sealing region 160 is formed by the projection 122 of the sheath section 121, in which the sleeve-like sheath section 121 juts above/protrudes beyond the longitudinal end 111 of the core 110.

Figure 2:
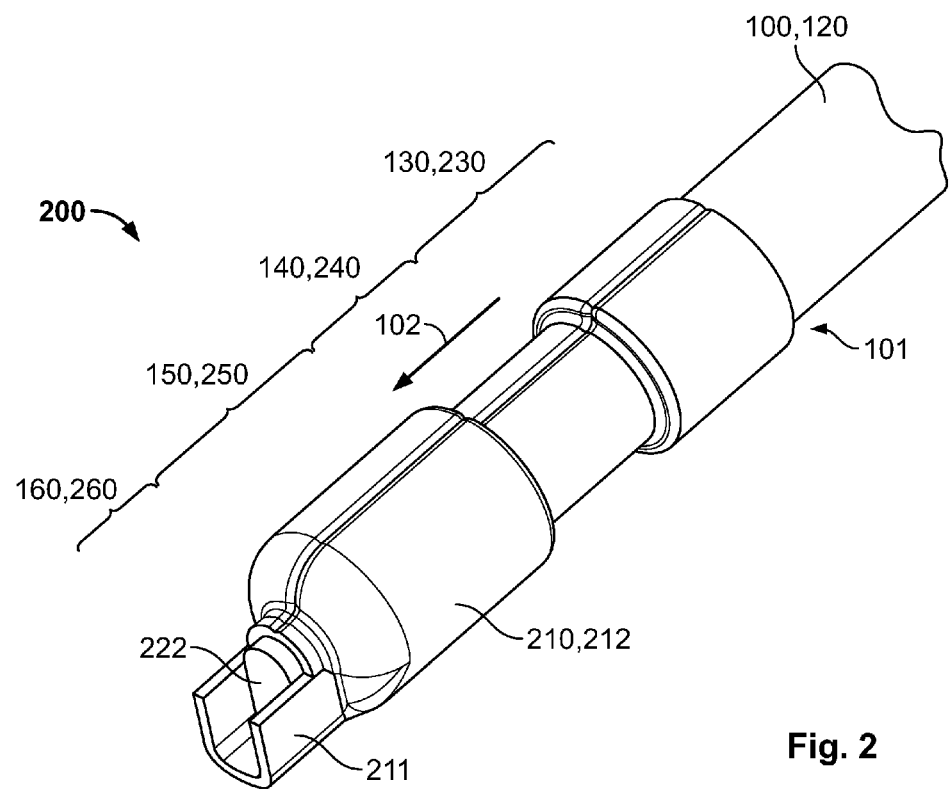
FIG. 2 shows a perspective and slightly schematized illustration of a conductor arrangement with an electrical conductor and a contact element pressed thereto.

FIG. 2 shows a schematic illustration of a conductor arrangement 200. The conductor 200 comprises the electrical conductor 100 of FIG. 1 and a contact element 210 attached to the electrical conductor 100. The contact element 210 is applied in the end region 101 of the electrical conductor 100 in order to connect the electrical conductor 100 with a further component which is not illustrated in FIG. 2, in an electrically conductive manner.

The contact element 210 consists of an electrically conducting material, preferably of a metal. The contact element 210 may for example be comprised of a copper material.

The contact element 210 is formed as a pressing or crimping contact, respectively. The contact element 210 comprises a crimp region 212 and a transition region 211. At the transition region 211, further sections of the contact element 210 may follow, which are not illustrated in FIG. 2. According to the area of application of the conductor arrangement 200, the further sections of the contact element 210 following the transition region 211 may be formed as a plug, socket or soldering contact for example.

The crimp region 212 of the contact element 210 is formed sleeve-like. The end region 101 of the electrical conductor 100 has been inserted into the sleeve-like crimp region 212 of the contact element 210. Subsequently, the crimp region 212 of the contact element 210 is pressed or crimped, respectively, at the end region 101 of the electrical conductor 100. Thereby, the crimp region 212 of the contact element 210 is plastically deformed in such a way that a mechanically robust connection between the contact element 210 and the electrical conductor 100 is established. The crimping may be carried out by means of a crimping tong.

In the conductor-side sealing region 130 of the electrical conductor 100, the crimp region 212 of the contact element 210 encloses the sheath 120 of the electrical conductor 100, whereby a conductor-side sealing region 230 of the conductor arrangement 200 is formed. The contact element 210 encloses the sheath 120 in the conductor-side sealing region 230 in such a firm way that an intrusion of moisture is prevented in the longitudinal direction 102.

In the contact region 140 of the electrical conductor 100, the crimp region 212 is in direct contact with the core 110 of the electrical conductor 100, whereby a contact region 240 of the contact arrangement 200 is formed within the contact region 240 of the conductor arrangement 200. Hence, an electrically conducting contact exists between the core 110 of the electrical conductor 100 and the contact element 210.

In the contact-side sealing region 150, the crimp region 212 of the contact region 210 encloses the sheath section 121 of the electrical conductor 100, whereby a contact-side sealing region 250 of the conductor arrangement 200 is formed.

In the front-side sealing region 160 of the electrical conductor 100, the projection 122 of the sheath section 121 is entirely compressed by the crimping of the crimp region 212 of the contact element 210, so that the crimp projection 222 entirely encloses the front-side longitudinal end 111 of the core 110. This region thereby forms a front side sealing region 260 of the conductor arrangement 200.

The front-side sealing region 260 and the contact-side sealing region 250 of the conductor arrangement 200 prevent an intrusion of moisture into the space between the contact element 210 and the electrical conductor 100 from the front-side longitudinal end of the electrical conductor 100.

Hence, the contact region 240 of the conductor arrangement 200 is protected against the intrusion of moisture in the longitudinal direction 102 of the electrical conductor 100 as well as in the direction opposing the longitudinal direction 102. Thereby, corrosion in the contact region 240 of the conductor arrangement 200 is prevented in an advantageous manner. A special advantage is that the core 120 of the electrical conductor 100 and the contact element 210 may consist of different metals without a galvanic cell being formed in the contact region 240.

Figure 3:
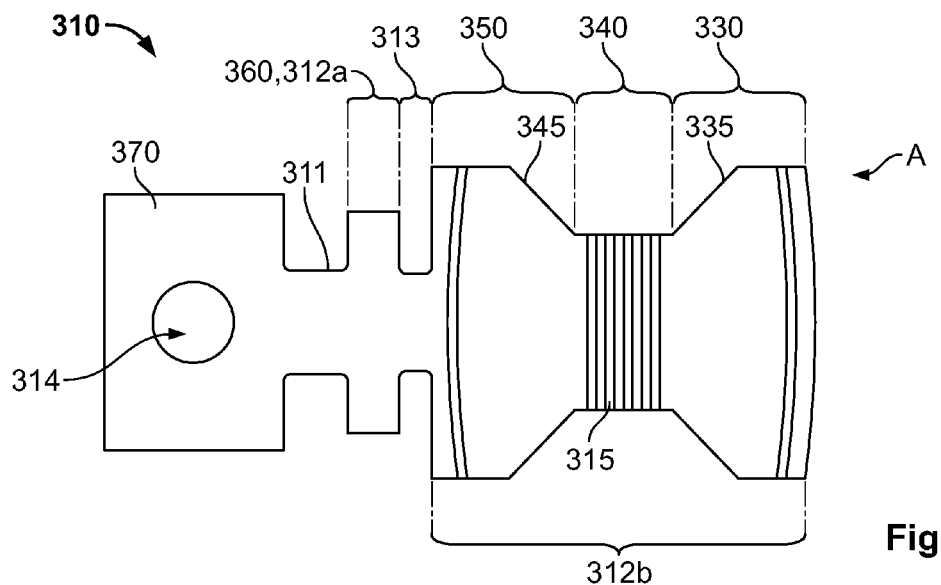
FIG. 3 shows a schematic top view of a contact element according to an embodiment of the present invention in a uncrimped state.

FIG. 3 shows a schematic top view of a contact element 310 according to an embodiment of the present invention in an uncrimped state A. The uncrimped state A is a state in which the contact element leaves a stamping tool as a stamped sheet of metal for example. The contact element 310 may consist of an electrical conductive material, preferably of a metal. The contact element 310 may for example consist of a copper material.

The contact element 310 may comprise a contact member 370, a transition region 311, a first crimp region 312a and a second crimp region 312b which may be connected to each other by a further transition region 313. The contact member 370 may be formed as desired for a certain application and may therefore comprise an eyelet 314 as shown herein or any other means for mounting or contacting the contact element 310. In other words, the contact member 370 may be provided as a dummy for any element which is desired in order to terminate and contact electrical equipment to the conductor 100 via the contact element 310.

The first crimp region 312a may serve for forming an end cap in the end region 101 of the electrical conductor 100. The second crimp region 312b may be configured to be formed as a sleeve or ferrule after the crimping in order to provide a conductor-side sealing region 330, a contact region 340 and a contact-side sealing region 350 of the contact element 310. The contact region 340 may be provided with ripples, serrations, grooves or other structural elements 315 for enhancing an electrical contact between the contact element 310 and the core 110 of the electrical conductor 100. The first crimp region 312a may be adapted to form a front-side sealing region 360 of the contact element 310.

Figure 4:
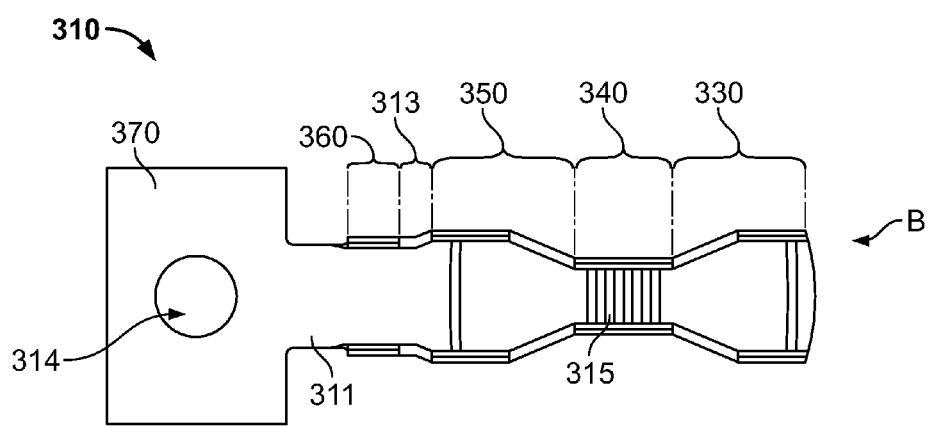
FIG. 4 shows a schematic top view of the contact element illustrated in FIG. 3 in a pre-crimped state.

FIG. 4 shows a schematic top view of the contact element 310 in a pre-crimped state where it is ready to be applied to the end region 101 of the electrical conductor 100. The electrical conductor 100 may for example be arranged on the contact element 310 after being prepared as shown in FIG. 1. The conductor-side sealing region 130 of the electrical conductor 100 may be placed on the conductor-side sealing region 330 of the contact element 310. The contact region 140 of the electrical conductor 100 may be placed at the contact region 340 of the contact element 310. The exposed core 110 of the electrical conductor 100 may be placed within the contact region 340 of the contact element 310. The contact-side sealing region 150 of the electrical conductor 100 may be placed within the contact-side sealing region 350 of contact element 310. The front-side sealing region 160 of the electrical conductor 100 may be placed within the front-side sealing region 360 of the contact element 310.

Figure 5:
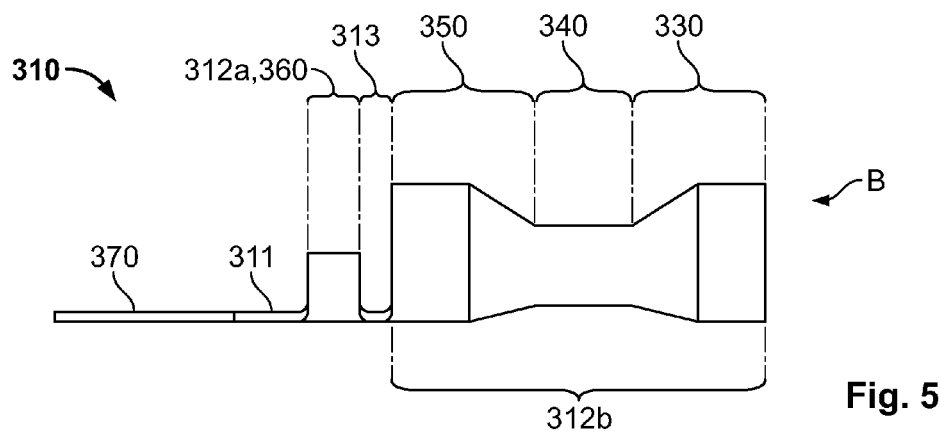
FIG. 5 shows a schematic side view of the contact element illustrated in FIG. 4.

FIG. 5 shows a schematic side view of the contact element 310 in the pre-crimped state B. Here it becomes apparent that the conductor-side sealing region 330, the contact region 340, the contact-side sealing region 350, i.e. the second crimp region 312b, as well as the front-side sealing region 360, i.e. the first crimp region 312a, extend essentially perpendicularly away from the contact member 370, the transition region 311 and the further transition region 313 so that the electrical conductor 100 may be placed within the contact element 310 at the level of the contact member 370, the transition 311 and the further transition 313 while being framed by the first crimp region 312a and the second crimp region 312b. Thereby, a further embodiment of a conductor arrangement 300 according to the present invention is prepared for being crimped in that the contact element 310 is transferred from the pre-crimped state B into a crimped state C.

FIG. 6 shows a schematic top view of a further possible embodiment of the conductor arrangement 300 according to the present invention. The conductor arrangement 300 comprises the conductor 100, which has been prepared as shown in FIG. 1 in order to be provided with the contact element 210, i.e. for the conductor arrangement 200. The conductor 100 is likewise prepared in order to be provided with a contact element 310 of the conductor arrangement 300.

The contact element 310 comprises the first crimp region 312a formed as an end cap. The end region 101 of the electrical conductor 100 has been inserted into the sleeve-like crimp region 312a of the contact element 310. The crimp region 312a of the contact element 310 is plastically deformed in such a way that a mechanically robust connection between the first crimp region 312a and the conductor 100 is established. The crimping may be carried out by means of a crimping tong.

After the crimping, analogously to the embodiment of the conductor arrangement 200 shown in FIG. 2, in the front-side sealing region 160 of the electrical conductor 100, the projection 122 of the sheath section 121 is entirely compressed by the first crimp region 312a, so that the crimp projection 222 entirely encloses the front-side longitudinal end 111 of the core 110. This region thereby forms a front-side sealing region 360 of the conductor arrangement 300. In other words, the crimp projection 222 is formed by the compressed sheath of the sheath section 121, which may be regarded as a sheath projection.

The second crimp region 312b is crimped to the end region 101 of the electrical conductor 100, which has been inserted into the first and second crimp regions 312a, 312b, which constitute a sleeve-like crimp region 312 of the contact element 310. Subsequently, the crimp region 312 is pressed or crimped, respectively, at the end region 101 of the electrical conductor 100. Thereby, the crimp region 312 of the contact element 310 is plastically deformed in such a way that a mechanically robust connection between the contact element 310 and the electrical conductor 100 is established. The crimping may be carried out by means of a crimping tong.

The contact element 310 comprises a crimp region 312 which may include the first and the second crimp regions 312a, 312b. In the conductor-side sealing region 130 of the electrical conductor 100, the crimp region 312, in particular the second crimp region 312b having the form of a ferrule encloses the sheath 120 of the electrical conductor 100 after the crimping, whereby the conductor-side sealing region 330 of the conductor arrangement 300 is formed. After crimping, the contact element 310 encloses the sheath 120 in the conductor-side sealing region 330 in such a way that an intrusion of moisture is prevented in the longitudinal direction 102.

In the contact region 140 of the electrical conductor 100, the crimp region 312, in particular the second crimp region 312b, is in direct contact with the core 110 of the electrical conductor 100, whereby the contact region 340 of the conductor arrangement 300 is formed. Hence, an electrically conductive contact exists between the core 110 of the electrical conductor 100 and the contact element 310.

In the contact-side sealing region 150, the crimp region 312, in particular the second crimp region 312b, of the contact element 310 encloses at least a portion of the sheath section 121 of the electrical conductor 100, whereby the contact side sealing region 350 of the conductor arrangement 300 is formed. In the contact-side sealing region 150, the crimp region 312, in particular the second crimp region 312b, of the contact element 310 encloses the sheath section 121 of the electrical conductor 100, whereby the contact-side sealing region 350 of the conductor arrangement 300 is formed.

Between the conductor-side sealing region 330 and the contact region 340 as well as between the contact-side sealing region 350 and the contact region 340, transition areas 335 and 345 are formed, respectively. In the transition areas 335 and 345, the outer contour of the second crimp region 312b extends slanted with respect to the longitudinal direction 102. The transition areas 335 and 345 are angled with respect to the longitudinal direction 102 and thereby at least a portion of the sheath 120, the sheath section 121 and/or the crimp projection 122 is housed and compressed in such a way that any openings or cavities are filled therewith. An intrusion of moisture is prevented not only in the longitudinal direction 102, but also at least partially perpendicular thereto in the transition areas 335 and 345 along the meeting edges of the mating crimp halves. In other words, the transition areas 335 and 345 are crimped in such a way that the respective portions of the sheath 120, the sheath section 121 and/or the crimp projection may fill up any hollow areas and thereby aid in the sealing process. Sealing up the connector arrangement 300 may at least partially be achieved by sheath material which expands or is urged into the transition areas 335 and 345 towards the contact region 340.

Hence, the contact region 340 of the conductor arrangement 300 is protected against the intrusion of moisture in the longitudinal direction 102 of the electrical conductor 100 as well as in the direction opposing the longitudinal direction 102. Thereby, corrosion in the contact region 340 of the conductor arrangement 300 is prevented in an advantageous manner. It is especially advantageous that the core 110 of the electrical conductor 100 and the contact element 310 may consist of different materials without a galvanic cell being formed in the contact region 340.

Further, the first crimp region 312a is provided with the contact member 370 which may serve as a mounting means in the form of a plate providing the eyelet 314 for mounting the conductor arrangement 300. The contact member 370 follows the transition region 311 of the contact element 310 and may also be formed as a plug, socket or any other kind of member which may allow for mounting the conductor arrangement 300.

FIG. 7 is a schematic semi-transparent top view of the electrical conductor 100 within the conductor arrangement 300 in the crimped state C. Here it becomes apparent that, in a direction perpendicular to the longitudinal direction 102 of the electrical conductor 100, the conductor-side sealing region 130 and the contact-side sealing region 150 of the electrical conductor 100 may be tapering towards the contact region 140 due to the respective compression of the sheath, especially due to the tapered geometry of the transition areas 335 and 345. A further transition region 113 of the electrical conductor 100 tapers towards the front side sealing region 160 and protrudes beyond the longitudinal end 111 of the core 110 so that a portion of the sheath section 121, in particular the further transition region 113, encloses the front-side longitudinal end 111 of the core 110. The projection 122 of the sheath section 121 is entirely compressed by the crimping of the crimp region 312, in particular the first crimp region 312a of the contact element 310, so that a crimp projection 322 seals up and/or entirely encloses the front-side longitudinal end 111 of the core 110. This region thereby forms the front-side sealing region 360 of the conductor arrangement 300.

FIG. 8 is a schematic semi-transparent side view of the electrical conductor 100 within the conductor arrangement 300 in the crimped state C. Here it becomes apparent that, in the front-side sealing region 360, the first crimp region 312a may be flattened with respect to the second crimp region 312b so that the front-side sealing region 160 of the electrical conductor 100, in particular the respective portion of the sheath section 121, is flattened, i.e. compressed in the direction perpendicular to the direction 102. Thereby, the front-side sealing region 160 of the electrical conductor 100 may be hermetically sealed.

Deviations from the above-described embodiments are possible within the inventive idea. For enhancing a protection of the core 110 against the intrusion of moisture, i.e. for better sealing up the conductor arrangement 200, 300, an additive, e.g. a grease or another sealant, may be applied in the crimp regions 212, 312, 312a, 312b, the structural elements 315 and/or the transition areas 335, 345 before crimping so that the additive serves as an optional sealant filling up capillaries in order to prevent capillary action. Further, the actual geometry of the further transitional areas 113, 313 can vary depending on the physical location of the longitudinal end 111 of the electrical conductor and/or on the amount of compression used in the crimping process. In either of the two contact configurations, it should be understood that at least a portion of the sheath section 121 is closed off at an end, in particular at the crimp projection 222, regardless of the final geometry of the compressed state of the sheath section 121.

The invention claimed is:
1. A method for attaching a contact element, comprising the following steps:
providing an electrical conductor with a conductive core and an insulating sheath;
detaching a sheath section of the sheath in an end region of the conductor;

displacing the sheath section against the core in such a way that the sheath section protrudes beyond a longitudinal end of the core;

providing a contact element having a front crimp portion and a core contact region;

crimping the contact element to the end region of the conductor in such a way that the detached sheath section is encompassed by the front crimp portion to define a front side sealing region and the core is crimped to the contact element in the core contact region, and the front crimp portion extends continuously to the core contact region to fully enclose the detached sheath section.

2. The method according to claim 1, wherein the detaching of the core section is effected through cutting.

3. The method according to claim 1, wherein the protruding part of the sheath section closes entirely around the longitudinal end of the core during the crimping.

4. The method according to claim 1, wherein the contact element before the crimping has a sleeve-like section and the end region of the conductor is inserted into the sleeve-like section before the crimping.

5. The method according to claim 1, wherein the crimp region of the contact element is crimped such that the crimp region encloses the sheath rearward of the core contact region.

6. A conductor arrangement within an electrical conductor with a conductive core and an insulating sheath, and with a contact element,
wherein the core has a longitudinal end in an end region of the conductor,
wherein the contact element comprises a conductor-side sealing region, a contact region and a contact-side sealing region, and wherein the contact element is crimped to the conductor in the end region of the conductor, and
wherein between the contact element and the core, a section of the sheath is arranged which section is detached from the remaining regions of the sheath exposing a portion of the core, the detached sheath section being crimped in the contact-side sealing region, the exposed core portion being crimped in the contact region and the remaining regions of the sheath are crimped in the conductor-side sealing region.

7. The conductor arrangement according to claim 6, wherein the detached section of the sheath protrudes beyond the longitudinal end of the core.

8. The conductor arrangement according to claim 7, wherein the protruding part of the sheath section is entirely closed around the longitudinal end of the core.

9. The conductor arrangement according to claim 6, wherein the conductor arrangement has a contact region, in which contact region an electrical contact exists between the contact element and the core,
wherein the contact arrangement has a contact-side sealing region, which is arranged between the contact region and the longitudinal end of the core,
wherein the detached section of the sheath is arranged in the contact-side sealing region.

10. The conductor arrangement according to claim 9,
wherein the conductor arrangement has a conductor side sealing region,
wherein the contact region is arranged between the contact-side sealing region and the conductor-side sealing region,
wherein in the conductor-side sealing region a further section of the sheath is arranged between the contact element and the core.

11. A conductor arrangement according to claim 8, wherein the contact element comprises a second crimp region and, in a contact region of the electrical conductor, the second crimp region of the contact element at least partly forms the contact region of the conductor arrangement.

12. A conductor arrangement according to claim 11, wherein the contact element further comprises a first crimp region crimped to the conductor in the end region of the conductor, and wherein the first crimp region and the second crimp region are separate pieces and/or crimping regions which may be crimped individually.

13. A conductor arrangement according to claim to 6, wherein the core has aluminium.

14. A conductor arrangement according to claim 6, wherein the sheath has PVC.

15. A conductor arrangement according to claim 6, wherein the contact element has a copper material.

16. The method according to claim 1, wherein the detached sheath section extends into a transition section of the terminal and the front crimp portion is crimped to an outer perimeter of the detached sheath section.

* * * * *